United States Patent Office 2,910,473
Patented Oct. 27, 1959

2,910,473
6-NITRO, 7-SULFAMYL-BENZOTHIADIAZINE-1,1-DIOXIDES

Frederick C. Novello, Lansdale, Pa., assignor to Merck & Co., Inc., Rahway, N.J., a corporation of New Jersey No Drawing. Application July 16, 1957
Serial No. 672,126

8 Claims. (Cl. 260—243)

This invention comprises novel benzothiadiazine-1,1-dioxide compounds containing a nitro as well as a sulfamyl substituent attached to the benzenoid portion of the nucleus.

The structural formula of the new compounds of this invention is illustrated below. In those compounds having no substituent other than hydrogen on either nitrogen in the benzothiadiazine-1,1-dioxide nucleus, the molecules possess a tautomeric system in which an alpha, gamma proton shift gives tautomers which have the double bond located either between the 2- and 3-position atoms or between the atoms in the 3- and 4-positions. In those compounds having a substituent on the nitrogen atom in the 2-position, the double bond exists between positions 3 and 4, and when substitution occurs on the $N^4$ atom, the double bond exists between positions 2 and 3. Thus, in general, the compounds can be considered having one of the general structures

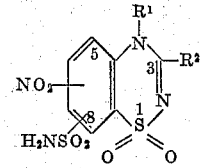

and

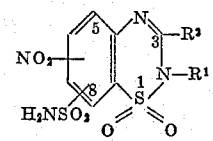

or these structures can be tautomeric isomers.

The novel benzothiadiazine-1,1-dioxide compounds of this invention therefore comprise compounds having a general structure as illustrated and defined above, and their non-toxic alkali metal salts, wherein $R^1$ is hydrogen or a lower alkyl radical advantageously containing from 1 to 5 carbon atoms and $R^2$ is hydrogen, a lower alkyl preferably having from 1 to 5 carbon atoms, or a mononuclear aryl such as a phenyl, benzyl, styryl and the like or similar radicals substituted in the phenyl moiety by halogen, lower alkyl or lower alkoxy and the like radicals.

The new compounds of this invention are useful pharmacotherapeutic agents particularly because of their diuretic and/or natriuretic properties. The compounds can be administered in therapeutic dosages in conventional vehicles as in the form of a tablet as these compounds are effective upon oral administration as well as upon injection. As the compounds of this invention also are readily soluble in a dilute alkaline medium or in polyethylene glycol solutions, injectable solutions can be prepared by dissolving the desired compound in the selected medium to which preservatives can be added if desired.

The new compounds of this invention also are useful in preparing novel benzothiadiazine-1,1-dioxide compounds containing an amino as well as a sulfamyl substituent attached to the benzenoid portion of the nucleus which also possess diuretic and/or natriuretic properties and which are the subject of my copending U.S. patent application Serial No. 672,127, filed by myself, Frederick C. Novello, on July 16, 1957.

The benzothiadiazine-1,1-dioxides containing a nitro as well as a sulfamyl substituent attached to the benzenoid portion of the nucleus can be prepared by a variety of methods. Two processes which have been found to be particularly well adapted to the preparation of these compounds containing the nitro and sulfamyl substituents in the 6- and 7-positions respectively can be illustrated as follows:

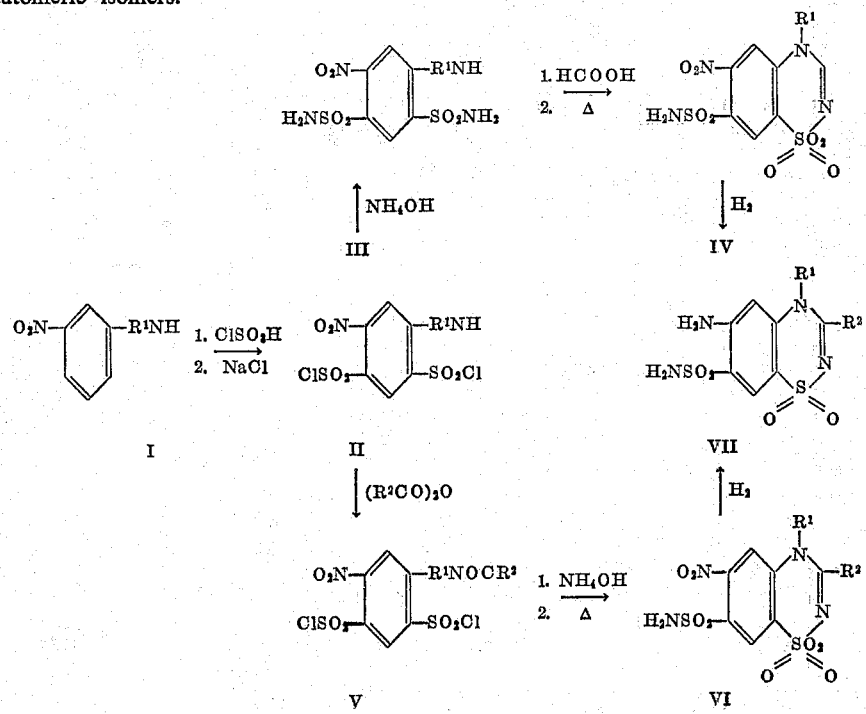

The process wherein the amino disulfonyl chloride is first converted to the amide, the amide then formylated and the compound cyclized is preferred when it is desired to prepare a benzothiadiazine-1,1-dioxide having no substituent on the carbon atom in the 3-position. The second method wherein the amino disulfonyl chloride is first acylated, then converted to the amide and subsequently cyclized is preferred when a benzothiadiazine-1,1-dioxide compound containing a substituent in the 3-position is to be prepared.

The chlorosulfonation of compound I is carried out in the presence of an alkali metal halide for example sodium, potassium or lithium chloride. For all practical purposes sodium chloride can be used as it is readily available, cheap, and in its presence the reaction proceeds quite smoothly. As the reaction between these ingredients is quite vigorous, it is preferred to add the aniline derivative to the chlorosulfonic acid dropwise with stirring and cooling. After all of the aniline derivative has been added, the alkali metal chloride is added in small portions to allow for the evolution of hydrogen chloride at a moderate rate. Following this, the mixture is heated at between about 100° to 200° C. preferably in an oil bath.

The disulfonyl chloride, II, thus obtained then can be converted to the disulfamyl derivative, III, by treatment with ammonia. The ammonia is employed in excess of that required to form the corresponding amino-benzene disulfonamide and advantageously can be added in the form of aqueous or alcoholic ammonium hydroxide, liquid ammonia or by dissolving the disulfonyl chloride in an organic solvent and bubbling ammonia gas into the solution to form the diamide compound. The diamide compound then is heated with formic acid or ethyl orthoformate at between about 100° to 150° C. after which the solvent is removed preferably by distillation thus forming the benzothiadiazine-1,1-dioxide compound, IV, having a nitro as well as a sulfamyl group attached to the benzenoid position of the nucleus. The formic acid or the ethyl orthoformate is used in quantity in excess of a molar equivalent.

The nitro substituent in compound IV then can be reduced to the corresponding amino group by known methods. Reduction advantageously can be effected by catalytic hydrogenation employing platinum or palladium as the catalyst. Platinum oxide has been found to be particularly suitable for this reduction, although other catalysts, such as platinum on a carrier, also can be used for the reduction of the nitro to the amino group to form compound VII.

Alternatively, the amino disulfonyl chloride compound, II, can be acylated with an organic acid chloride or anhydride, the acid advantageously being selected from a lower alkanoic acid such as acetic acid, propionic acid, caproic acid and the like, or a mononuclear aryl-monocarboxylic acid such as benzoic acid, phenylacetic acid, cinnamic acid, and the like. This reaction proceeds quite smoothly at room temperature yielding the N-acyl-disulfonyl chloride derivative, V, containing a nitro as well as a sulfonyl chloride substituent attached to the benzenoid portion of the nucleus.

The acylation of compound II can be carried out at room temperature or, if desired, by warming. At least a molar equivalent of the acylating compound is employed in the reaction although an excess of the acylating reagent can be used if it is desired to have this reactant serve as a solvent for compound II as well. If because of cost or limited availability of the acylating agent it is desired to use another solvent in the reaction mixture, this can, of course, be done. Suitable solvents include benzene, toluene, xylene, dioxane or other inert organic solvents which will dissolve compound II without interfering in any way with the acylating reaction.

The acylated compound V, then can be converted to the corresponding amide by the method described above employing, advantageously, aqueous or alcoholic ammonium hydroxide, liquid ammonia, or ammonia gas and the N-acyl-disulfamyl compound thus obtained is heated at between about 150° to about 250° C. to form the cyclized product, VI, which also contains a nitro as well as a sulfamyl substituent attached to the benzenoid portion of the nucleus.

The nitro group in the cyclized product, VI then can be converted to the amino group by reduction according to the process described above for reducing compound IV to compound VII.

Another process which also has been found to be particularly well adapted to the preparation of compounds containing the amino (or nitro) and sulfamyl substituents in the 6- and 7-positions respectively and which also contain a substituent other than hydrogen on the 2-position nitrogen can be illustrated as follows:

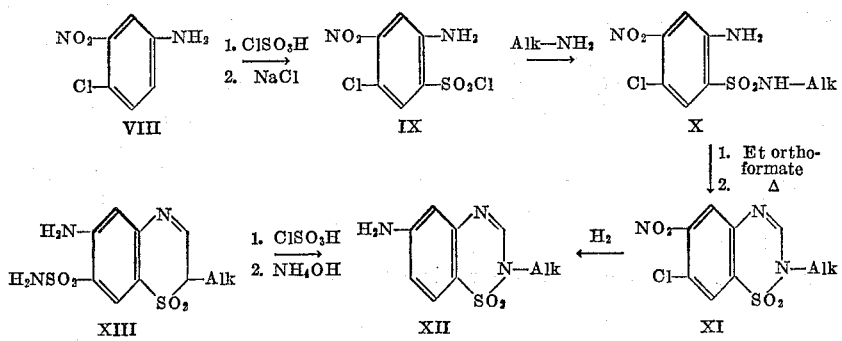

The chlorosulfonation of compound VIII is carried out in substantially the same manner as described above for the chlorosulfonation of compound I. The 2-amino-5-chloro-4-nitro-benzenesulfonyl chloride thus obtained then is reacted with the selected lower-alkylamine which is employed in an amount in excess of two equivalents and preferably with heating to complete the reaction to form the 4-chloro-2-(N-lower-alkylsulfamyl)-5-nitro-aniline. This reaction product, X, then is treated with ethyl orthoformate in quantity in excess of a molar equivalent and at about between 100–150° C. to form the cyclized product, XI, 2-alkyl-7-chloro-6-nitro-1,2,4-benzothiadiazine-1,1-dioxide. The nitro substituent then can be reduced and the chlorine simultaneously removed by the method described above. The 2-alkyl-6-amino-compound then is chlorosulfonated to introduce the 7-sulfonyl chloride group and this group then converted to the sulfamyl substituent by treatment with ammonia by substantially the same method described for conversion of the disulfonyl chloride compound II, to the corresponding disulfamyl derivative, III, thus forming the desired 2-lower alkyl-6-amino-7-sulfamyl-1,2,4-benzothiadiazine-1,1-dioxide.

An alternative method for preparing compound XIII from compound X comprises heating compound X with sodium sulfite to form the sodium 4-amino-5-(N-lower alkylsulfamyl)-2-nitrobenzenesulfonate. This product then can be treated with chlorosulfonic acid and then with ammonia by the process described above for converting compounds I and II to the sulfamyl derivative thus forming 2-N-alkylsulfamyl-5-nitro-4-sulfamylaniline which, upon treatment with ethyl orthoformate by the process described above and then heating is cyclized to the 2-alkyl-6-nitro-7-sulfamyl-1,2,4-benzothiadiazine-1,1-dioxide. This cyclized product then can be reduced to convert the nitro to the amino derivative, XIII.

A fourth novel process for preparing the compounds of this invention, particularly those wherein the amino (or nitro) and sulfamyl substituents are attached to the 7- and 6-positions respectively can be illustrated as follows:

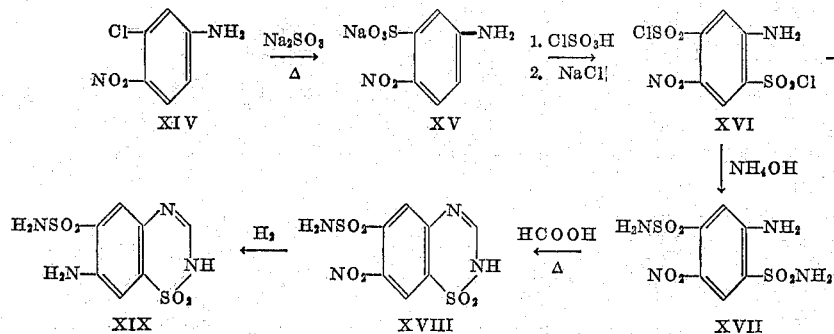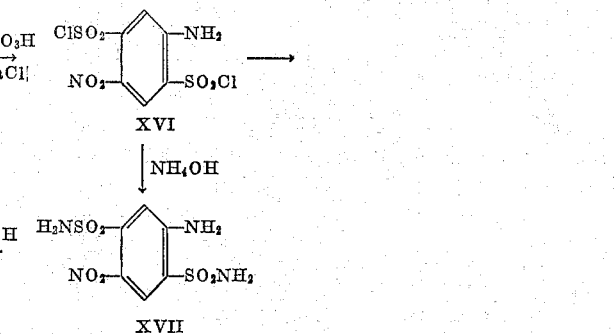

The 3-chloro-4-nitroaniline intermediate in this process is converted to the sodium 5-amino-2-nitrobenzene-sulfonate by heating the aniline compound, preferably under reflux, with sodium sulfite. An excess of sodium sulfite dissolved in water is advantageously employed in this reaction. The reaction product thus obtained, XV, then is chlorosulfonated, converted to the disulfamyl derivative, XVII, and then cyclized and the nitro substituent can be reduced to the corresponding amino by the process described above for preparing compounds II, III, IV, and VII thus forming 7-amino (or nitro)-6-sulfamyl-1,2,4-benzothiadiazine-1,1-dioxide.

The alkali metal salts of the benzothiadiazine-1,1-dioxide compounds of this invention can be prepared by dissolving the selected compound in an aqueous or alcoholic solution of the alkali metal hydroxide, and, if desired, isolating the salt by evaporating the solvent. Any of the conventional alkali metal salts, such as the sodium, potassium, lithium or the like salt, can be prepared by this method or by other methods known to organic chemists.

The amino substituted benzothiadiazine-1,1-dioxide compounds of this invention, as well as the corresponding intermediate nitro compounds are new compounds and both of these series of compounds possess diuretic and/or natriuretic properties.

The preparation of these compounds is more fully described in the following examples. It is to be understood, however, that the examples are illustrative of the compounds embraced by this invention and of the methods for their preparation and are not to be construed as limiting the invention to the particular compounds or methods specifically described.

EXAMPLE 1

*6-amino-7-sulfamyl-1,2,4-benzothiadiazine-1,1-dioxide*

Step a.—m-Nitroaniline (64 g., 0.5 mole) is added dropwise with stirring to 375 ml. of chlorosulfonic acid in a 3 liter round bottom, 3-necked flask cooled in an ice bath. Sodium chloride (350 g.) is added portionwise over a period of 1–2 hours and the mixture then heated gradually in an oil bath to 150° C. After 3 hours at 150–160° C., the flask is cooled thoroughly in an ice bath and the contents treated with a liter of cold water. The product is extracted with ether, the extract washed with water and dried over sodium sulfate. After removal of ether on the steam bath, the residual 5-nitroaniline-2,4-disulfonyl chloride is obtained. This product is cooled in an ice bath and treated with 150 ml. of 28% ammonium hydroxide in a 2 liter Erlenmeyer flask. The mixture is heated on the steam bath for 1 hour, cooled and the product collected on the filter, washed with water and dried. Upon crystallization from dilute alcohol, 2,4-disulfamyl-5-nitroaniline is obtained as colorless needles, melting point 260–262° C.

*Analysis.*—Calculated for $C_6H_8N_4O_6S_2$: C, 24.32; H, 2.72; N, 18.91. Found: C, 24.53; H, 2.71; N, 19.11.

Step b.—A solution of 5 g. of 2,4-disulfamyl-5-nitroaniline in 175 ml. of 98–100% formic acid is heated under reflux for 3 hours. After thorough cooling, the colorless needles are collected on the filter, washed with alcohol, and dried yielding 6-nitro-7-sulfamyl-1,2,4-benzothiadiazine-1,1-dioxide, melting point 338–339° C. with decomposition.

*Analysis.*—Calculated for $C_7H_6N_4O_6S_2$: C, 27.45; H, 1.98; N, 18.30. Found: C, 27.73; H, 2.28; N, 18.17.

Step c.—A solution of 2.7 g. of the thus obtained 6-nitro-7-sulfamyl-1,2,4-benzothiadiazine-1,1-dioxide in 600 ml. of a 50% alcohol-water mixture is shaken in an atmosphere of hydrogen with 400 mg. of platinum oxide catalyst until hydrogen absorption ceases. The catalyst is removed by filtration and the solution concentrated to dryness in vacuo. Crystallization of the residue from a 50% alcohol-water mixture yields 6-amino-7-sulfamyl-1,2,4-benzothiadiazine-1,1-dioxide as colorless needles, melting point 323–324° C. with decomposition.

*Analysis.*—Calculated for $C_7H_8N_4O_4S_2$: C, 30.43; H, 2.92; N, 20.28. Found: C, 30.62; H, 3.16; N, 20.16.

EXAMPLE 2

*6-amino-3-methyl-7-sulfamyl-1,2,4-benzothiadiazine-1,1-dioxide*

Step a.—A solution of 5.0 g. of 5-nitroaniline-2,4-disulfonyl chloride, obtained as described in step a, Example 1, in 15 ml. of acetic anhydride is allowed to stand at room temperature for 45 minutes. After cooling, the crystalline product, N-acetyl-5-nitroaniline-2,4-disulfonyl chloride, is collected, treated with 50 ml. of 10% alcoholic ammonia and evaporated to dryness on the steam bath. The residue is heated at 200° C. for ½ to 1 hour, cooled and crystallized from dilute alcohol to give 3-methyl-6-nitro-7-sulfamyl-1,2,4-benzothiadiazine-1,1-dioxide.

Step b.—A solution of 3.0 g. of the product obtained in step a in 600 ml. of a 50% alcohol-water mixture is shaken in an atmosphere of hydrogen with 400 mg. of platinum oxide catalyst until hydrogen absorption ceased. The catalyst is removed by filtration and the solution concentrated to dryness in vacuo. Crystallization of the residue from a 50% alcohol-water mixture yields 6-amino-3-methyl-7-sulfamyl-1,2,4-benzothiadiazine-1,1-dioxide.

EXAMPLE 3

6 - amino - 3 - propyl - 7 - sulfamyl - 1,2,4 - benzothiadiazine-1,1-dioxide

By replacing the acetic anhydride employed in Example 2, step *a*, by an equivalent quantity of butyric anhydride and following the same procedure described in steps *a* and *b* of Example 2, there is obtained 6-amino-3-propyl-7-sulfamyl-1,2,4-benzothiadiazine-1,1-dioxide.

EXAMPLE 4

6 - amino - 3 - amyl - 7 - sulfamyl - 1,2,4 - benzothiadiazine-1,1-dioxide

By replacing the acetic anhydride employed in Example 2, step *a*, by an equivalent quantity of n-caproic anhydride and following substantially the same procedures described in steps *a* and *b* of Example 2, there is obtained 6 - amino - 3 - amyl - 7 - sulfamyl - 1,2,4 - benzothiadiazine-1,1-dioxide.

EXAMPLE 5

6 - amino - 4 - methyl - 7 - sulfamyl - 1,2,4 - benzothiadiazine-1,1-dioxide

Step *a*.—By replacing the m-chloroaniline employed in Example 1, step *a*, by an equimolar quantity of 3-nitro-N-methylaniline and chlorosulfonating by substantially the same procedure described in Example 1, step *a*, there is obtained 5-nitro-N-methylaniline-2,4-disulfonyl chloride which, when treated with ammonium hydroxide by the process also described in Example 1, step *a*, is converted to the corresponding 2,4-disulfamyl-5-nitro-N-methylaniline.

Step *b*.—By replacing the 5-nitro-2,4-disulfamylaniline employed in Example 1, step *b*, by an equimolar quantity of 2,4-disulfamyl-5-nitro-N-methylaniline, obtained as described above, and following substantially the same procedure described in step *b* of Example 1, there is obtained 4-methyl-6-nitro-7-sulfamyl-1,2,4-benzothiadiazine-1,1-dioxide.

Step *c*.—By replacing the 6-nitro-7-sulfamyl-1,2,4-benzothiadiazine-1,1-dioxide employed in Example 1, step *c*, by an equimolar quantity of the product obtained in step *b* above, and following substantially the same procedure described in step *c* of Example 1, there is obtained 6 - amino - 4 - methyl - 7 - sulfamyl - 1,2,4 - benzothiadiazine-1,1-dioxide.

EXAMPLE 6

6-amino-2-methyl-7-sulfamyl-1,2,4-benzothiadiazine-1,1-dioxide

Step *a*.—By replacing the m-nitroaniline employed in Example 1, step *a*, by an equimolar quantity of 4-chloro-3-nitroaniline and following substantially the same procedure described there for chlorosulfonating the m-nitroaniline, there is obtained 2-amino-5-chloro-4-nitrobenzenesulfonyl chloride which is extracted with ether, the extract washed with water, and then dried over sodium sulfate. After removal of the ether on the steam bath, the residual product is cooled in an ice bath and treated with 150 ml. of 40% aqueous methylamine in a 2 liter Erlenmeyer flask. The mixture is heated on the steam bath for one hour, cooled, and the product collected on the filter, washed with water and dried. Upon crystallization from dilute alcohol, 4-chloro-2-(N-methylsulfamyl)-5-nitroaniline is obtained.

Step *b*.—A mixture of 10 g. of the thus obtained 4-choloro-2-(N-methylsulfamyl)-5-nitroaniline and 25 ml. of ethyl orthoformate is heated at 125–135° C. for 30 minutes. The solvent then is removed by distillation in vacuo and the residue crystallized from alcohol to give 7 - chloro - 2 - methyl - 6 - nitro - 1,2,4 - benzothiadiazine-1,1-dioxide.

Step *c*.—A solution of 2.7 g. of the thus obtained product in 600 ml. of a 50% alcohol-water mixture is shaken in an atmosphere of hydrogen in the presence of 400 ml. of platinum oxide catalyst and the reduction carried out by substantially the same procedure rescribed in Example 1, step *c*, yielding 6-amino-2-methyl-1,2,4-benzothiadiazine-1,1-dioxide.

Step *d*.—The thus obtained cyclized product is treated with chlorosulfonic acid and heated on the steam bath for 2 hours, cooled, and poured onto ice. Treatment of the product with 28% ammonium hydroxide yields 6-amino - 2 - methyl - 7 - sulfamyl - 1,2,4 - benzothiadiazine-1,1-dioxide.

EXAMPLE 7

6-amino-2-methyl-7-sulfamyl-1,2,4-benzothiadiazine-1,1-dioxide

Step *a*.—A solution of 25.6 g. of 2-(N-methylsulfamyl)-4-chloro-5-nitroaniline (obtained as described in Example 6, step *a*) in 400 ml. of ethanol is heated under reflux for ½–1 hour with a solution of 30 g. of sodium sulfite in 150 ml. of water. The reaction mixture is cooled in an ice bath and the sodium 4-amino-5-(N-methylsulfamyl)-2-nitrobenzenesulfonate which crystallizes is collected on the filter and dried.

Step *b*.—An equimolar quantity of the thus obtained product is substituted for the m-chloroaniline employed in Example 1, step *a*, and substantially the same procedures described in Example 1, steps *a* and *b* are followed to produce 2-(N-methylsulfamyl)-5-nitro-4-sulfamylaniline.

Step *c*.—The product obtained in step *b* is heated at between about 125–135° C. with an excess of ethyl orthoformate for about 30 minutes. The solvent then is removed by distillation in vacuo and the residue crystallized from alcohol to give 2-methyl-6-nitro-7-sulfamyl-1,2,4-benzothiadiazine-1,1-dioxide.

Step *d*.—A solution of the thus obtained product in 600 ml. of a 50% alcohol-water mixture is shaken in an atmosphere of hydrogen in the presence of 400 ml. of platinum oxide catalyst and the reduction carried out by substantially the same procedure described in Example 1, step *c*, yielding 6-amino-2-methyl-7-sulfamyl-1,2,4-benzothiadiazine-1,1-dioxide.

EXAMPLE 8

6-amino-4-ethyl-7-sulfamyl-1,2,4-benzothiadiazine-1,1-dioxide

By replacing the 3-nitro-N-methylaniline employed in Example 5, step *a*, by an equimolar quantity of 3-nitro-N-ethylaniline and following substantially the same procedures described in steps *a* through *c* of Example 5, there is obtained 6-amino-4-ethyl-7-sulfamyl-1,2,4-benzothiadiazine-1,1-dioxide.

EXAMPLE 9

6-amino-3,4-dimethyl-7-sulfamyl-1,2,4-benzothiadiazine-1,1-dioxide

Step *a*.—By replacing the 5-nitroaniline-2,4-disulfonyl chloride employed in Example 2, step *a*, by an equimolar quantity of 5-nitro-N-methylaniline-2,4-disulfonyl chloride (prepared as described in Example 5, step *a*) and following substantially the same procedure described in Example 2, step *a*, there is obtained 3,4-dimethyl-6-nitro-7-sulfamyl-1,2,4-benzothiadiazine-1,1-dioxide.

Step *b*.—By replacing the 6-nitro-7-sulfamyl-1,2,4-benzothiadiazine-1,1-dioxide employed in Example 1, step *c*, by an equimolar quantity of 3,4-dimethyl-6-nitro-7-sulfamyl-1,2,4-benzothiadiazine-1,1-dioxide and following substantially the same procedure described in Example 1, step *c*, there is obtained 6-amino-3,4-dimethyl-7-sulfamyl-1,2,4-benzothiadiazine-1,1-dioxide.

EXAMPLE 10

*6-amino-3-phenyl-7-sulfamyl-1,2,4-benzothiadiazine-1,1-dioxide*

By substituting an equal volume of benzoyl chloride for the acetic anhydride employed in Example 2, step *a*, and following substantially the same procedures described in steps *a* and *b* of Example 2, there is obtained 6-amino-3-phenyl-7-sulfamyl-1,2,4-benzothiadiazine-1,1-dioxide.

EXAMPLE 11

*6-amino-3- benzyl-7-sulfamyl-1,2,4-benzothiadiazine-1,1-dioxide*

By substituting an equal volume of phenylacetyl chloride for the acetic anhydride employed in step *a*, Example 2, and following substantially the same procedures described in steps *a* and *b* of Example 2, there is obtained 6 - amino - 3 - benzyl - 7 - sulfamyl - 1,2,4 - benzothiadiazine-1,1-dioxide.

EXAMPLE 12

*7-amino-6-sulfamyl-1,2,4-benzothiadiazine-1,1-dioxide*

Step *a*.—A solution of 17.2 g. of 3-chloro-4-nitroaniline in 300 ml. of ethanol is heated under reflux for ½ to 1 hour with a solution of 30 g. of sodium sulfite in 150 ml. of water. The reaction mixture is cooled in an ice bath and the sodium 5-amino-2-nitrobenzenesulfonate which crystallizes is collected on the filter and dried.

Step *b*.—An equimolar quantity of the thus obtained product is substituted for the m-chloroaniline employed in Example 1, step *a*, and substantially the same procedures described in Example 1, steps *a* and *b* are followed to produce 7-nitro-6-sulfamyl-1,2,4-benzothiadiazine-1,1-dioxide.

Step *c*.—The thus obtained product is reduced by following the same procedure described in Example 1, step *c*, thus yielding 7-amino-6-sulfamyl-1,2,4-benzothiadiazine-1,1-dioxide.

EXAMPLE 13

*Sodium salt of 6-nitro-7-sulfamyl-1,2,4-benzothiadiazine-1,1-dioxide*

6 - nitro - 7 - sulfamyl - 1,2,4 - benzothiadiazine - 1,1-dioxide, obtained as described in Example 1, is dissolved in alcoholic sodium hydroxide and the solvent then evaporated in vacuo yielding the sodium salt of 6-nitro-7-sulfamyl-1,2,4-benzothiadiazine-1,1-dioxide.

EXAMPLE 14

*Compressed tablet comprising 0.5 g. active ingredient*

| | G. |
|---|---|
| 6 - nitro - 7 - sulfamyl - 1,2,4 - benzothiadiazine-1,1-dioxide | 500.0 |
| Starch paste 12½%, 100 cc., allow | 12.5 |
| | 512.5 |
| Starch U.S.P. corn | 25.0 |
| Magnesium stearate | 5.5 |
| | 543.0 |

The 6-nitro-7-sulfamyl-1,2,4-benzothiadiazine-1,1-dioxide is granulated with the starch paste and while moist passed through a No. 14 screen, dried at 45° C. for 20 hours and then passed 3 times through a No. 14 screen. The starch then is passed through a No. 90 bolting cloth onto the granulation and all ingredients are blended thoroughly. Then the magnesium stearate is passed through a No. 90 bolting cloth onto the granulation and these ingredients are blended after which the granulation is compressed into tablets using $^{13}\!/_{32}''$ flat, bevelled, scored punch having a thickness of 0.205±0.005 yielding 1,000 tablets, each weighing 0.543 grams and having a hardness of 6 kgms. measured by the Monsanto Chemical Company tablet hardness tester apparatus, and a disintegration time of 5 minutes when tested on the U.S.P. tablet disintegrating apparatus (U.S. Pharmacopeia, 15th edition, page 937).

While the above examples describe the preparation of certain illustrative compounds illustrated by the structure on page 1, and a certain specific dosage form suitable for administering the novel compounds of this invention in human therapy, it is to be understood that the invention is not to be limited by these examples or by the specific reaction conditions described for the preparation of the compounds or by the specific ingredients included in the pharmaceutical preparation but is understood to embrace variations and modifications falling within the scope of the appended claims.

This application is a continuation-in-part of my co-pending U.S. patent application, Serial No. 582,082, filed May 2, 1956, now Patent No. 2,809,194.

What is claimed is:

1. Benzothiadiazine-1,1-dioxide compounds selected from the class consisting of compounds having one of the general structures

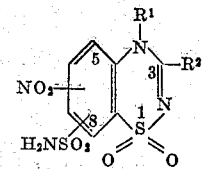

and

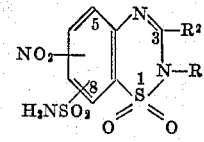

tautomeric isomers thereof, and their non-toxic alkali metal salts, wherein $R^1$ is selected from the group consisting of hydrogen and lower alkyl radicals; and $R^2$ is selected from the group consisting of hydrogen, lower alkyl, phenyl, and benzyl radicals.

2. Benzothiadiazine-1,1-dioxides represented by the general tautomeric structures

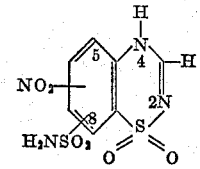

and

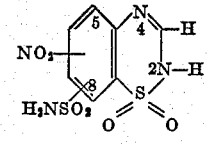

3. 6 - nitro - 7 - sulfamyl - 1,2,4 - benzothiadiazine - 1,1-dioxide.

4. Benzothiadiazine-1,1-dioxides represented by the general tautomeric structures

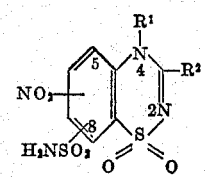

and

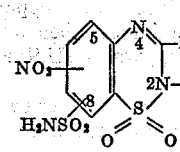

wherein R² is a lower alkyl radical.

5. Benzothiadiazine-1,1-dioxides represented by the general structure

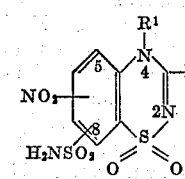

wherein R¹ is a lower alkyl radical.

6. Benzothiadiazine-1,1-dioxides represented by the general structure

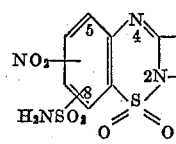

wherein R¹ is a lower alkyl radical.

7. Benzothiadiazine-1,1-dioxides represented by the general structure

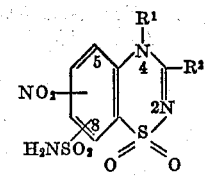

wherein R¹ and R² respectively is a lower alkyl radical.

8. An improvement in a method for preparing a 7-nitro-6-sulfamyl-1,2,4-benzothiadiazine-1,1-dioxide compound, comprising the steps wherein the disulfonyl chloride reactant is prepared by heating a 3-chloro-4-nitroaniline with an excess of sodium sulfite in aqueous solution to form the sodium 5-amino-2-nitrobenzene-sulfonate which then is admixed with chlorosulfonic acid and an alkali metal halide and the mixture then heated at between about 100–200° C. yielding the 4-nitroaniline-2,5-disulfonyl chloride reactant which then is converted by amidation with a compound selected from the group consisting of ammonia and a lower-alkylamine followed by cyclization by heating with a compound selected from the group consisting of formic acid and its lower-alkyl ortho esters to the desired 7-nitro-6-sulfamyl-1,2,4-benzothiadiazine-1,1-dioxide.

References Cited in the file of this patent
UNITED STATES PATENTS
2,809,194    Novello _____ Oct. 8, 1957